Sept. 19, 1967        E. TOROSSIAN        3,342,477
EXTENSIBLE HYDRAULIC CONTROL ELEMENT FOR LOCKING MOUNTINGS
Filed Dec. 14, 1964
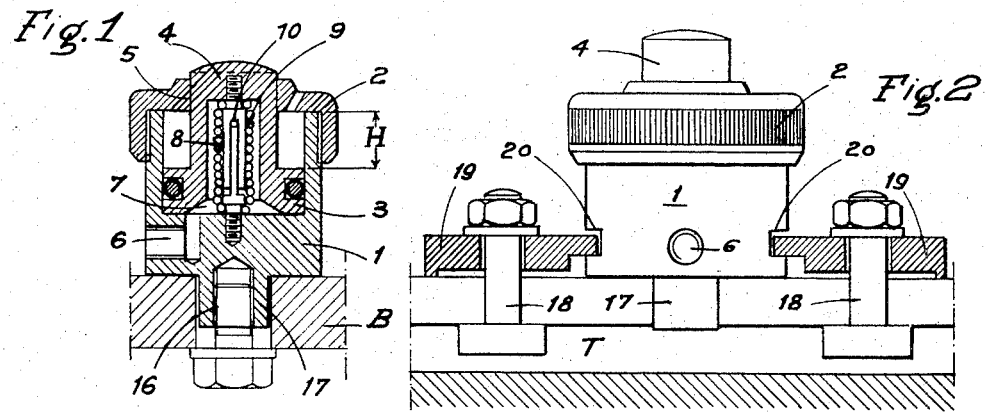
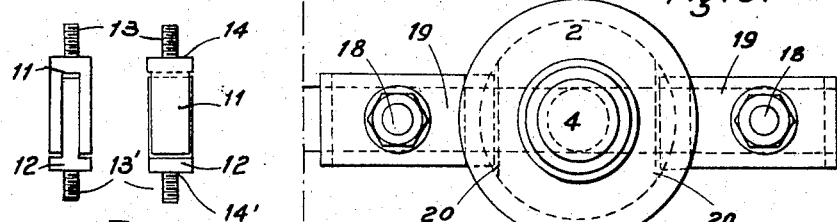
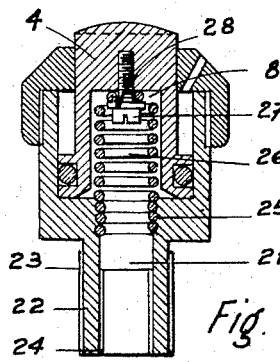
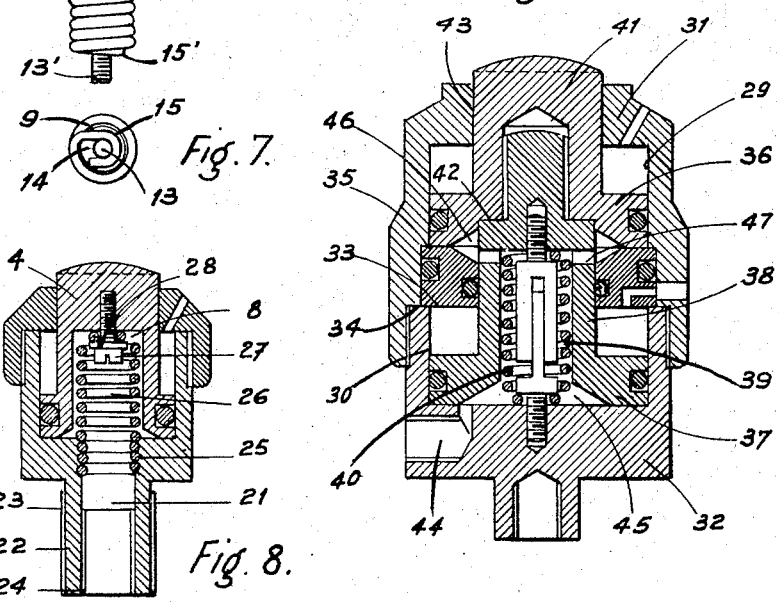

United States Patent Office 3,342,477
Patented Sept. 19, 1967

3,342,477
EXTENSIBLE HYDRAULIC CONTROL ELEMENT FOR LOCKING MOUNTINGS
Edouard Torossian, Bolleystr. 50, Zurich, Switzerland
Filed Dec. 14, 1964, Ser. No. 417,876
Claims priority, application Switzerland, Dec. 14, 1963, 15,382/63
8 Claims. (Cl. 269—25)

This invention relates to fluid actuated clamps of the kind more particularly used in industry for clamping and holding workpieces on a support such as a machine table during machining operations.

Such devices comprise particularly a number of elements which include:

(1) A casing capable of being secured to a frame or base and of being connected to a conduit for the supply of oil under pressure;

(2) A thrust or clamping member attached to a piston having a predetermined stroke and arranged in a casing so that the advance of the piston under the action of an inflow of fluid under high pressure will cause the positioning and clamping of the workpiece;

(3) A reutrn spring intended to free the workpiece by returning the piston and thrust member to their initial position as soon as the fluid pressure is released.

Hitherto such clamping devices have all been designed so that the return of the piston is obtained by means of a compression spring, which thus necessitates the provision inside the casing of an appropriate large supplementary recess which, when added to the bulk of the piston and the space reserved for the stroke thereof, considerably increases the dimensions of these devices. Although it is of greatest importance to industry to reduce the dimensions of these devices to the minimum for the same power, the bulk of the fittings, their weight and handiness depends very largely upon that of the elements utilised in the devices.

The object of the present invention is to remedy this significant drawback by providing a fluid actuated clamp characterized in that it utilizes a tension spring lodged in the clamping or thrust member, for the return of the piston.

It will be appreciated that this novel arrangement of the spring in no-wise affects the bulk of the extensible element, this bulk thus remaining solely a function of the mechanical characteristics of the element, namely its power and the stroke of the piston.

The invention will now be described by way of example with reference to the accompanying drawings in which:

FIGURE 1 represents a clamping device according to the invention in vertical section, with an end mounting on a suitable base, FIGURE 2 represents this device in elevation, with an example of lateral mounting, for example on a machine table, FIGURE 3 is a plan view of FIGURE 2, FIGURE 4 and 5 show a composite spindle permitting the mounting of the spring, in front view and in profile, FIGURES 6 and 7 show, in elevation and in plan view, a traction spring utilised in the above element, mounted on the spindle, FIGURE 8 and 9 represent two modifications in vertical section.

As may be seen from FIGURE 1, the clamping device comprises a casing formed by a cylindrical cup shaped body 1 and a cover 2 screwed on this body.

A piston 3 is movable in the body 1 under the action of hydraulic fluid and is formed integrally with a clamping or thrust member 4 which projects from a bore 5 of the cover 2, this bore 5 serving at the same time to guide the clamping or thrust member 4.

A tapped lateral orifice 6 receives the inlet connection for the hydraulic fluid from any suitable pressure source so that fluid enters the chamber 7 formed between the piston 3 and the bottom of the casing, into which chamber 7 there also opens the recess 8 formed internally around the axis of the thrust member 4. The recess 8 serves as a housing for the tension spring 9, which is mounted through the intermediary of a spindle 10 and acts constantly to hold the piston 3 and the thrust member in the withdrawn position.

FIGURES 4, 5, 6 and 7 show the details of the spindle 10 and the spring 9 which permit immediate fitting and dismantlement of the latter.

The spindle 10 (FIGURES 4 and 5) is formed by a fork 11 formed in a rod of a diameter slightly smaller than the internal diameter of the spring 9. A turn screw 12 slidably fits within the fork 11 and is also milled from a rod of the same diameter. The fork 11 and the turn screw 12 includes respectively the axial threaded journals 13 and 13′, which are of smaller diameter than that of the spindle, so that shoulders 14 and 14′ are formed.

The spindle 10 is located within the spring 9 and then imprisoned therein by turning down of the two end turns 15 and 15′ (FIGURES 6 and 7) over the shoulders 14 and 14′.

This arrangement has the result that any screwing or unscrewing action exerted for example upon the journal 13 involves a similar action upon 13′ and vice versa.

Any traction exerted upon the above journals causes the extension and tensioning of the spring 9 by the sliding of the turn screw 12 in the fork 11.

In order to place the spring in position in the assembly of the device it is sufficient first to screw one of the journals, for example 13, into an axial tapping formed for this purpose in the bottom of the recess 8 of the thrust member, and then to introduce the piston 3 into the body 1 until the journal 13′ engages in a corresponding tapping therefor and to rotate it until complete locking occurs, in which case the spring will be sufficiently braced and at a sufficient initial tension to cause the complete withdrawal of the clamping or thrust member.

In order to avoid any dislocation on displacement of the piston, the length of the turn screw 12 engaged in the fork 11 is substantially greater than the maximum stroke H of the thrust member.

FIGURE 1 shows that the dimensions of the clamping device are a function solely of its power and the stroke H of the piston. The dimensions are reduced to the minimum compatible with its mechanical characteristics, and the return spring being lodged in a recess in no way affects the size of the device.

The device can be secured upon a frame B by the base or by a tapping 16 provided in a boss 17 (FIGURE 1) and intended to receive the securing screw, or laterally, for example upon a machine table T, by making use of the grooves of this table, of ties 18 and catch pieces 19 which engage in notches 20 milled towards the base of the cup 1 (FIGURES 2 and 3).

The modification shown in FIGURE 8 is characterised in that the fluid supply to the element takes place through the base, through a neck 21 formed in a journal 22, provided with a threaded portion 23 for the securing of the element, and a tapping 24 to receive the connections.

The neck 21 opens into the body by indentations 25 in which one of the ends of the traction spring 26 is screwed, the other end of this spring having been subjected to a tightening of its turn in order to permit its fixing, after fitting, by means of a screw 27 and a washer 28, to the bottom of the recess 8 formed in the thrust member 4, a screwdriver being introduced through the neck 21 for this purpose.

The reduction in size obtained by this arrangement permits the provision of a clamping device, with equal oil pressure and stroke, but with power double that of the elements at present manufactured, without exceeding the dimensions thereof.

This result is obtained by twin elements, of which FIGURE 9 shows an example of such an embodiment in vertical section.

As may be seen from this figure, a twin element is constituted by the coupling of two cylinders 29 and 30 arranged in tandem on the same axis.

It is obvious that this coupling can be effected in various ways. In the example as represented in FIGURE 9, it is effected by screwing together of two inverted casings 31 and 32, which are separated by a fluid-tight partition 33, which is held in place between the lip 34 of the casing 32 and a shoulder 35 of the casing 31.

In these two cylinders there move two integral pistons 36 and 37, the first being screwed upon a journal 38 of the piston 37 which passes through the partition 33 in fluid-tight fashion. A recess 39 formed in the journal 38 receives the traction spring 40, mounted as indicated above, while the thrust member 41 which is integral with the piston 36, disposed in extension of this journal 38 and resting solidly upon shoulders 42 thereof, passes through the casing 31 by the bore 43 which guides the two pistons.

The device is supplied with fluid through the tapped orifice 44 which brings the fluid into the chambers 45 and 46 which are in communication through the recess 39 and the lateral orifices 47.

The securing of this twin element to a fixed structure can be effected as indicated above, with reference to FIGURES 1, 2 and 3.

What I claim is:

1. Fluid-actuated clamp comprising a cylinder, a displaceable piston located in said cylinder, a thrust member connected to said piston for displacement therewith and being formed with a chamber for receiving pressure fluid, said piston and thrust member being displaceable in said chamber from an initial non-clamping position to a final clamping position by the action of pressure fluid supplied to said chamber, and tension spring means disposed in said chamber and connecting said thrust member and said cylinder for biasing said thrust member and piston in a direction back from said final position to said initial position thereof.

2. Clamp according to claim 1 wherein said cylinder is cup-shaped, and including a cover member for the open end of said cup-shaped cylinder, said cover member being formed with a bore therethrough, said thrust member being guided by and projecting through said bore.

3. Clamp according to claim 1 wherein said thrust member is integral with said piston.

4. Clamp according to claim 1 having a pair of adjacent cylinders separated by a fluid-tight partition, a displaceable piston disposed in each of said cylinders, an axial rod extending through an opening in said partition and interconnecting said pistons, said axial rod providing a support for said thrust member and being formed with an axial recess communicating with both of said cylinders, said tension spring means being disposed in said axial recess, port means in said axial rod for supplying pressure fluid through said axial recess to both said cylinders in common.

5. Clamp according to claim 1 wherein said thrust member is formed with an axial recess and a two-part spindle is disposed in said recess, said tension spring means also being disposed in said recess mounted on said spindle, one of the parts of said spindle being a fork-shaped member and the other a turn screw fitted in said fork-shaped member, each of said spindle-parts having a threaded journal respectively securing it to said cylinder and said thrust member.

6. Clamp according to claim 1 wherein said cylinder has a base formed with a tapped boss, and including means for securing the clamp to a support, said means comprising a threaded fastener engaging in said tapped bore.

7. Clamp according to claim 1 wherein said cylinder has a casing formed with lateral notches adapted to receive respective catch pieces for securing the clamp to a support.

8. Clamp according to claim 1 wherein said cylinder has a base formed with a tapped neck portion for supplying pressure fluid thereto, said neck portion being externally threaded for connecting the clamp to a support, said tapped neck portion adjacent its opening into said cylinder being formed with suitable indentions in which one end of said tension spring means is threaded, a screw threaded to said thrust member in said chamber thereof, the other end of said tension spring means having a turn of reduced diameter tightly retained by said screw.

References Cited

UNITED STATES PATENTS 1,837,689  12/1931  Sunde _____ 269—25

RICHARD H. EANES, Jr., *Primary Examiner.*